United States Patent
Liang et al.

(10) Patent No.: US 12,072,462 B2
(45) Date of Patent: Aug. 27, 2024

(54) MACHINE LEARNING ENHANCED BOREHOLE SONIC DATA INTERPRETATION

(71) Applicant: Schlumberger Technology Corporation, Sugar Land, TX (US)

(72) Inventors: Lin Liang, Belmont, MA (US); Ting Lei, Arlington, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/618,714

(22) PCT Filed: Jun. 13, 2020

(86) PCT No.: PCT/US2020/037645
§ 371 (c)(1),
(2) Date: Dec. 13, 2021

(87) PCT Pub. No.: WO2020/252419
PCT Pub. Date: Dec. 17, 2020

(65) Prior Publication Data
US 2022/0244419 A1    Aug. 4, 2022

Related U.S. Application Data

(60) Provisional application No. 62/902,009, filed on Sep. 18, 2019, provisional application No. 62/861,756, filed on Jun. 14, 2019.

(51) Int. Cl.
*G01V 1/50*    (2006.01)
*G01V 1/46*    (2006.01)
*G06N 3/08*    (2023.01)

(52) U.S. Cl.
CPC ............. *G01V 1/50* (2013.01); *G01V 1/46* (2013.01); *G06N 3/08* (2013.01); *G01V 2210/20* (2013.01); *G01V 2210/626* (2013.01)

(58) Field of Classification Search
CPC ........ G01V 1/50; G01V 1/46; G01V 2210/20; G01V 2210/626; G06N 3/08
See application file for complete search history.

(56) References Cited

U.S. PATENT DOCUMENTS

| 7,120,541 B2 | 10/2006 | Wang |
| 2004/0133531 A1 | 7/2004 | Chen et al. |
| 2018/0149019 A1* | 5/2018 | Bose ............... E21B 47/005 |

(Continued)

OTHER PUBLICATIONS

Assous et al., "Dispersive Mode Processing of Borehole Acoustic Logs Using Fast Slowness-Frequency Inversion", Abu Dhabi International Petroleum Exhibition & Conference held in Abu Dhabi, UAE, Nov. 12-15, 2018 (Year: 2018).*

(Continued)

*Primary Examiner* — Mohamed Charioui
*Assistant Examiner* — Xiuqin Sun
(74) *Attorney, Agent, or Firm* — Ashley Brown

(57) ABSTRACT

The subject disclosure relates to the interpretation of borehole sonic data using machine learning. In one example of a method in accordance with aspects of the instant disclosure, borehole sonic data is received, and machine learning is used to interpret the borehole sonic data.

5 Claims, 14 Drawing Sheets

(56) References Cited

U.S. PATENT DOCUMENTS

2019/0025452 A1 1/2019 Wang et al.

OTHER PUBLICATIONS

International Preliminary Report on Patentability issued in PCT/US2020/037645, dated Dec. 23, 2021, 14 pages.
Kimball et al. "Semblance processing of borehole acoustic array data", Geophysics, 49, 3, 274-281, 1984.
Lang et al., "Estimating slowness dispersion from arrays of sonic logging waveforms", Geophysics, 52, 4, 530-544, 1987.
Schoenberg, M., Muir, F. and Sayers, C.M., 1996, Introducing Annie: A simple three-parameter anisotropic velocity model for shales, J. Seis. Expl., 5, 35-49.
Thomsen, L., 1986, Weak elastic anisotropy, Geophysics, 51, 1954-1966.
Aeron et al., "Automatic dispersion extraction using continuous wavelet transform", 2008 IEEE International Conference on Acoustics, Speech and Signal Processing, Las Vegas, NV, 2008, pp. 2405-2408.
Ester et al., "A density-based algorithm for discovering clusters in large spatial databases with noise. Proceedings of the Second International Conference on Knowledge Discovery and Data Mining (KDD-96)", Aaai Press. pp. 226-231, 1996.
International Search Report and Written Opinion issued in PCT/US2020/037645, dated Oct. 13, 2020 (17 pages).
Assous et al., Dispersive Mode Processing of Borehole Acoustic Logs Using Fast Slowness-Frequency Inversion, Abu Dhabi International Petroleum Exhibition & conference, Society of Petroleum Engineers, Nov. 12-15, 2018, pp. 1-8.
He et al., Generation of Synthetic dielectric dispersion logs in organic-rich shale formations using neural-network models, Geophysics, May 1, 2019, vol. 84, No. 3, pp. 1-44.
Substantive Exam issued in SA Application No. 521431109 dated Mar. 31, 2023, 27 pages with English translation.
Extended Search Report issued in European Patent Application No. 20821958.4 dated May 19, 2023, 9 pages.
Zeng et al., "Dispersion analysis of borehole sonic measurements by Hilbert transform and band-pass filters", Geophysics, 2018, 83(4), pp. D127-D150.
Assous et al., "Phase-based dispersion analysis for acoustic array borehole logging data", The Journal of the Acoustical Society of America, American Institute of Physics, 2014 135(4), 10 pages.

\* cited by examiner

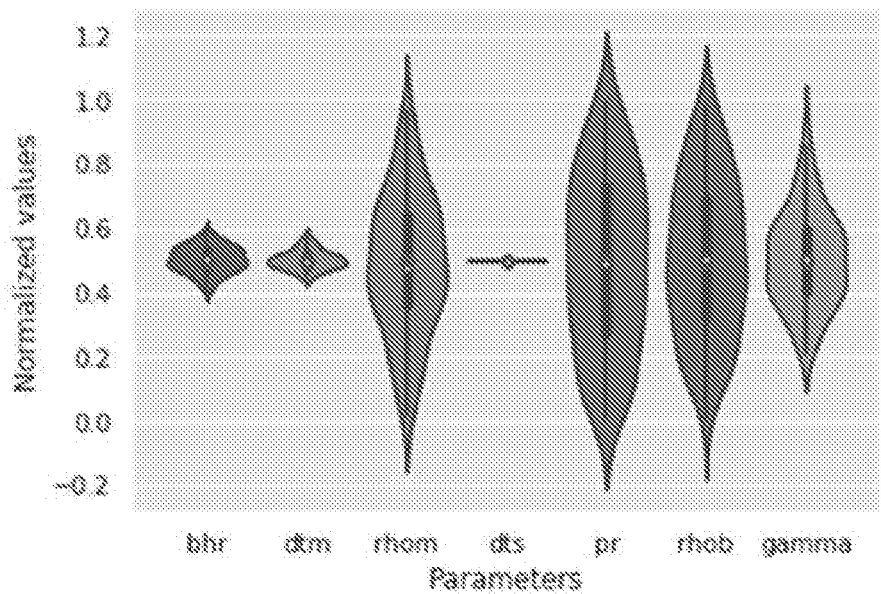
Fig. 6
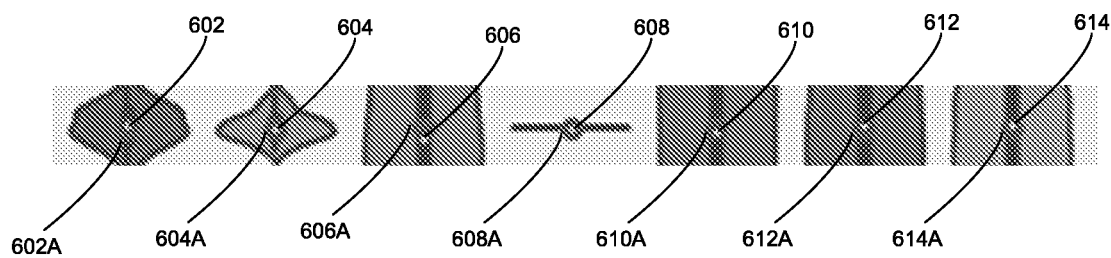
Fig. 6A
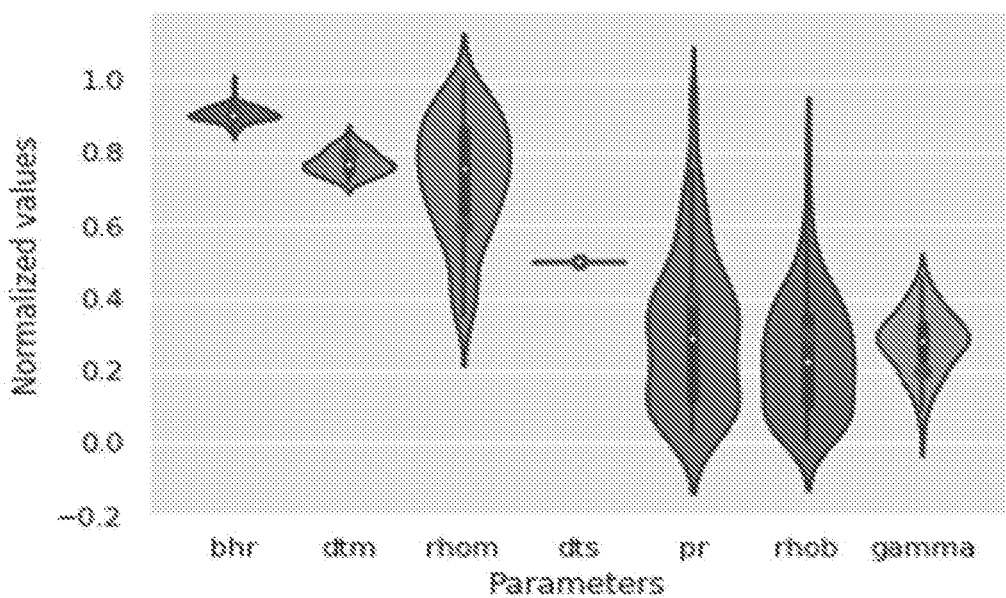

ized patent form.

MACHINE LEARNING ENHANCED BOREHOLE SONIC DATA INTERPRETATION

CROSS REFERENCES

This application claims the benefit of both: a) U.S. Provisional Patent App. No. 62/861,756, "Machine learning enhanced borehole sonic data interpretation," filed 14 Jun. 2019; and b) U.S. Provisional Patent App. No. 62/902,009, "Neural network enhanced borehole data," filed 18 Sep. 2019, the complete disclosures of which are hereby incorporated herein by reference.

BACKGROUND

Various methods have been developed to interpret borehole sonic dispersion data to invert for formation elastic properties, such as the classical model-based inversion of the shear parametric inversion (SPI) method. See U.S. Pat. No. 7,120,541 hereinafter referred to as "Wang," which is herein incorporated by reference in its entirety. Such techniques are computationally expensive and assume the dispersion to follow a certain parametric mathematical function and consequently cannot accurately obtain formation shear slowness when the formation is strongly anisotropic. Additionally, this inversion method only works for the dipole dispersion mode (i.e., flexural mode) and cannot be easily extended to other modes like Stoneley, Quadrupole, and Pseudo-Rayleigh modes.

Moreover, for many applications, physics-based analytical, semi-analytical, or numerical solutions for forward modeling are time consuming. This prevents their usage for time-sensitive tasks. In borehole sonic dispersion interpretation, labeling and extraction of different dispersion modes has relied on signal processing methods which completely ignore physics, or are based on linear scaling of simplified physical models (e.g., homogeneous isotropic model), which fail to capture nonlinear effects, especially when the formation is strongly anisotropic. All existing approaches are not fully automated and rely on parameter tuning for challenging cases. Further, there is no automatic algorithm to analyze and identify the different anisotropy mechanism presented by the sonic signals measured in the borehole.

Accordingly, this application discloses various methods and techniques to enhance and interpret borehole data. Moreover, those with skill in the art will appreciate that many methods and techniques disclosed herein may be utilized with ultrasonic dispersion modes. The methods and techniques disclosed herein may improve and enhance understanding of dispersion modes, uncertainty, anisotropy, and other borehole data interpretation matters.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, inversion and interpretation of borehole sonic dispersion data using machine learning based approaches are described. The method includes generating a training dataset (i.e., look-up tables) from a mode search or any other analytical or numerical methods and using the training dataset to train neural networks to approximate the solutions. These neural network proxies can be used for sensitivity analysis and performing inversion to the measured sonic data. Relevant model parameters can be estimated with associated uncertainties. In addition, various machine learning methods can also be developed based on the generated training dataset which can be used to infer relevant model parameters with uncertainties from the field data directly.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 6 depicts a violin plot of the distribution of inverted parameters from 100 inversion realizations;

FIG. 6A is an enlargement of the central area of FIG. 6;

FIG. 7 depicts a violin plot of the distribution of inverted parameters from 100 inversion realizations;

DETAILED DESCRIPTION

Figure 1:
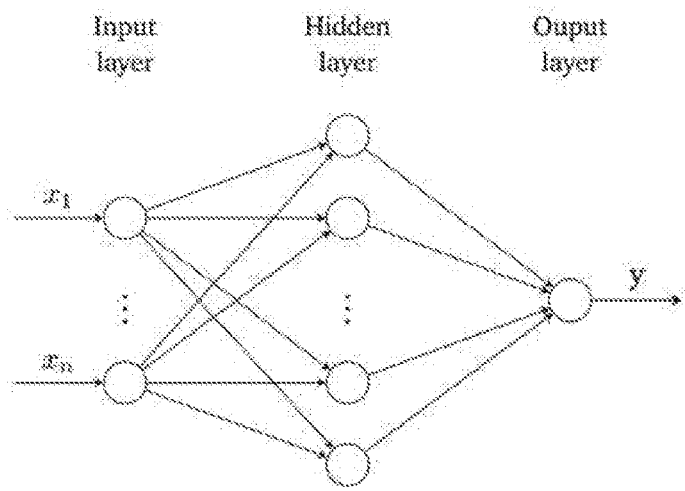
FIG. 1 depicts a conceptual fully connected network with a hidden layer, where x is the vector of model parameters and y is the vector of dipole flexural dispersions.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Aspects of the instant disclosure relate to the interpretation of borehole sonic data. In the oil and gas industry, sonic devices are lowered into a well to measure the travel time of sound which could be excited by different types of sources. Various characteristics of the formation and borehole environment could be interpreted from the recorded sonic waves through a variety of methods. Interpreted formation properties including compressional and shear velocities, density, and elastic anisotropy are widely used in the mechanical characterization and formation petrophysical evaluation.

While different wave modes could be initiated from the different sources and converted along the travel paths, a few of these wave modes show dispersive characteristics, i.e., the velocity varying with the frequency, for example, Stoneley, pseudo-Rayleigh, flexural, and quadrupole dispersion. Traditional ways to estimate relevant model parameters from those measurements include semblance-based methods such as the Slowness-Time Coherence (STC) analysis, and the model-based inversion method by minimizing differences between the measured and modeled dispersion data, such as the shear parametric inversion (SPI). See Wang and Kimball et al. "Semblance processing of borehole acoustic array data", Geophysics, 49, 3, 274-281, 1984.

The modeled dispersion data can be computed by analytical or numerical algorithms or interpolated from the pre-computed look-up tables. Those measured modal dispersion data can be extracted from the measured sonic waveforms through different algorithms such as the Prony's method. See Lang et al., "Estimating slowness dispersion from arrays of sonic logging waveforms", Geophysics, 52, 4, 530-544, 1987. The model-based inversion process is generally expensive in terms of computational cost. The look-up table can be used for fast inversion, but it is usually large in size and not accurate enough in some regions of the parameter space where higher non-linearity is present.

In an embodiment, machine learning based methods for enhancing the interpretation of borehole sonic data are described. The look-up tables are generated from a mode search or other analytical or numerical solvers and are used to train neural network models as accurate and efficient proxies which can be used for inversion of field data. Machine learning based methods are also used to automate the labeling and extraction of different modal dispersion data from the recorded waveforms with proper pre-processing. In an embodiment, methods include training machine learning models from field sonic data to infer relevant model parameters with associated uncertainties. In some embodiments, methods in accordance with this disclosure may also include training machine learning models from the generated synthetic data to directly infer relevant model parameters with associated uncertainties from field data.

Data Preparation

In an embodiment, a mode search algorithm is utilized to generate synthetic dispersion curves for a large volume of parameter combinations. As an non-limiting example, for an ANNIE model [Schoenberg, M., Muir, F. and Sayers, C. M., 1996, Introducing ANNIE: A simple three-parameter anisotropic velocity model for shales, J. Seis. Expl., 5, 35-49] where three Thomson parameters [Thomsen, L., 1986, Weak elastic anisotropy, Geophysics, 51, 1954-1966, hereinafter Thomsen] are reduced to 1, we assume the parameters with assigned values listed as below:

bhr: [3.50, 3.75, 4.00, 4.25, 4.50]
dtm: [190, 196, 202, 208, 214, 220]
rhom: [800, 1000, 1200, 1400]
dts: [80, 85, 90, 95, 100, 105, 110, 115, 120, 125, 130, 135, 140, 145, 150, 155, 160, 165, 170, 175, 180]
pr: [0.1, 0.2, 0.3, 0.4]
rhob: [1800, 2000, 2200, 2400, 2600]
gamma: [0, 0.05, 0.10, 0.15, 0.200, 0.25, 0.30, 0.35, 0.40, 0.45, 0.50, 0.55, 0.60]
freq: [1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0]

Here, bhr, dtm, rhom, dts, pr, rhob, gamma, and freq represent borehole radius (inch), mud slowness (μs/ft), mud density (kg/m3), formation shear slowness (μs/ft), Poisson's ratio, formation density (kg/m3), Thomsen anisotropic parameter γ (unitless) [See Thomsen], and frequency (kHz), respectively. The ranges of these parameters can be further extended if needed. The ANNIE model can be further extended to a three Thomsen parameter model if needed. Those with skill in the art will also appreciate that other models, parameter combinations and related approaches may be practiced in accordance with the methods disclosed herein.

The mode search algorithm is run for any combination of the above parameters in the defined ranges. The inputs (for example, seven model parameters including bhr, dtm, rhom, dts, pr, rhob, and gamma) and corresponding outputs (different slowness values corresponding to different frequencies at sonic tool acquisition range) are stored in a data file.

Training and Validation

In accordance with some embodiments, the machine learning problem may then be phrased as follows: given a set of model parameters, find the corresponding slowness at a set of pre-defined frequencies. To solve this problem, different neural network structures can be used. In an embodiment, a standard fully connected neural network is considered, as conceptually depicted in FIG. 1, with ReLU activation functions. The number of hidden layers and neurons of the network can be optimized through the training process. To train, optimize, and test the solution, we split the samples in three subsets for training, validation and testing, respectively. We trained the network with an Adam optimizer. The objective function was a standard mean square error. The training process converges well without overfitting.

Figure 2:
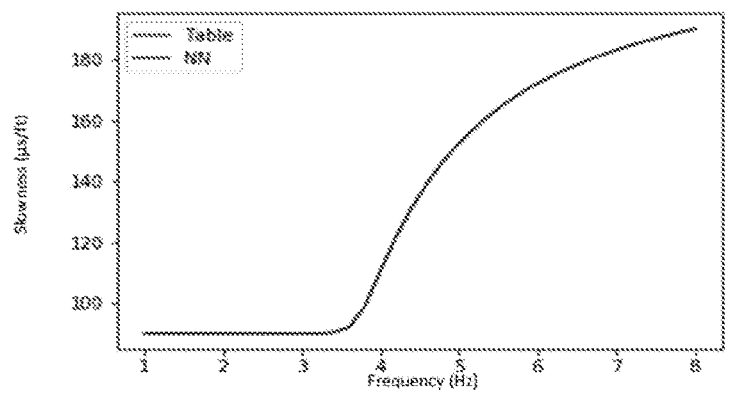
FIG. 2 depicts a comparison of dipole dispersion curves generated by neural networks and a look-up table which is equivalent to a mode search.

The trained neural network model can be validated against a mode search. FIG. 2 shows a comparison of results for the case defined on the table node, (i.e., a case existing in the training dataset, and in this case, the look-up table was generated from amode search). Skilled artisans will understand that the two curves represented in the plot are almost exactly the same because this case is present in the training dataset (bhr=4 inch, dtm=202 μs/ft, rhom=1200 kg/m3, dts=90 μs/ft, pr=0.1, rhob=1800 kg/m3, gamma=0.5).

Figure 3:
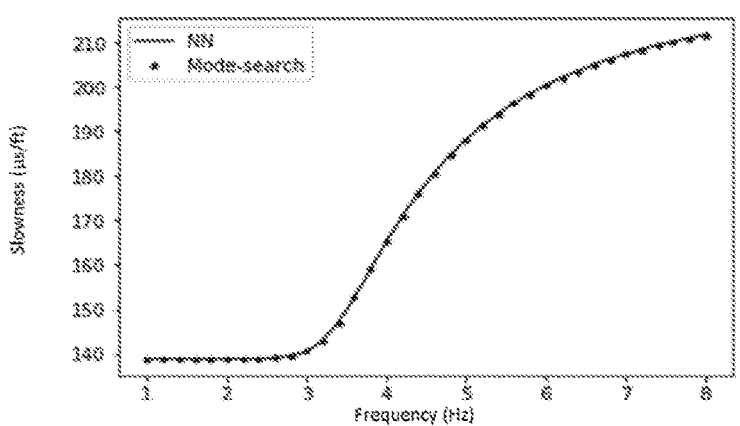
FIG. 3 depicts a comparison of dipole dispersion curves generated by neural networks and a mode search.
Figure 4:
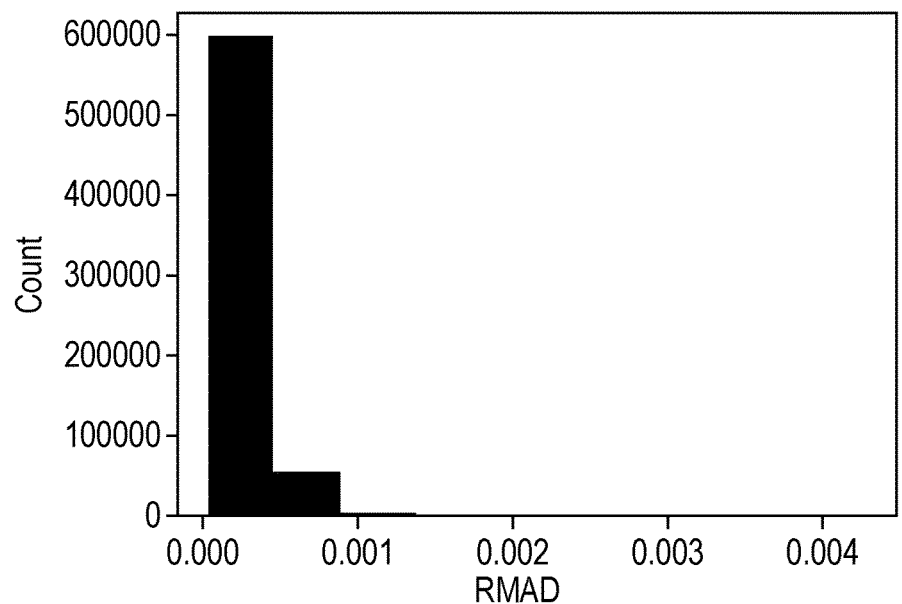
FIG. 4 depicts a distribution of computed relative mean absolute differences (RMAD) between neural network results and the training dataset.

FIG. 3 shows a comparison for the case off the table node, i.e., a case which is not present in the training dataset (This case is not present in the training dataset (bhr=4.26, dtm=215.4, rhom=1016, dts=138.8, pr=0.34, rhob=1954.6, gamma=0.17)). The trained neural network model generated perfect results compared to the mode search. We perform the comparison to all the cases in the training dataset and plot the histogram of the relative mean absolute differences (RMAD) between the results from neural network models and mode search. As shown in FIG. 4, we achieved a very good accuracy except for a small volume of cases with RMAD close to 0.001. Further investigation shows that all these cases are located on the edges of the defined ranges for the parameters. This issue can be overcome by extending the definition ranges or making denser grids close to the edges or increasing weights of those cases along the edges.

A benchmark shows that the trained neural network models have achieved a significant increase in speed compared to the mode search. A test on the workstation with one Titan Xp GPU card demonstrated that neural network models are over 30,000 times faster than the mode search method.

Inversion Based on the Trained Neural Network

The trained neural network model which has a high accuracy and efficiency can be used as a forward solver for the inversion of borehole sonic dispersion data.

We first test it on a synthetic case 1 with parameters bhr=0.5, dtm=0.5, rhom=0.5, dts=0.5, pr=0.5, rhob=0.5 and gamma=0.5. Note that here these values are unitless after normalization with respect to the range of each parameter defined previously, i.e., bhr=0.5 can be translated to bhr=4 inches based on the defined range of 3.5~4.5. We perform 100 inversion realizations separately with each one starting from a random initial model.

Figure 5:
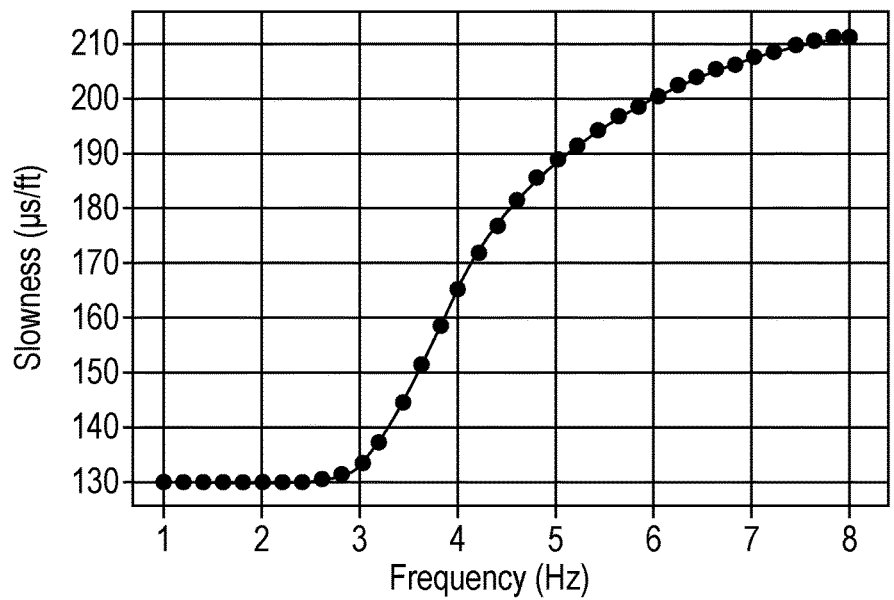
FIG. 5 depicts synthetic dispersion data (dots) versus the reconstructed data (curves, overlapped) from 100 inversion realizations.

As shown in FIG. 5, all inversions converge to match the data well, but obtain very different solutions as shown in FIG. 6, which depicts a violin plot of the distribution of inverted parameters from 100 inversion realizations, shows that, in this case, the median of each inverted parameter matches the true value well. The true model is defined as bhr=0.5, dtm=0.5, rhom=0.5, dts=0.5, pr=0.5, rhob=0.5 and gamma=0.5 which are values normalized to the interval of [0, 1] based on the defined ranges of these parameters. The central dots in the respective plots represent the true values. To elaborate and make that more clear, an enlargement of the area of the violin plots with the dots in FIG. 6 is provided in FIG. 6A to better show the median values vs. true values (see FIG. 6A, interior dots 602, 604, 606, 608, 610, 612, 614 vs. larger dots 602A, 604A, 606A, 608A, 610A, 612A, 614A, respectively.) Shear slowness can be accurately inverted due to high sensitivity. The borehole radius and mud slowness show relatively smaller uncertainty compared to the densities, Poisson's ratio, and Thomsen parameter γ.

We test on the synthetic case 2 with parameters bhr=0.9, dtm=0.8, rhom=0.6, dts=0.5, pr=0.4, rhob=0.3 and gamma=0.2. All 100 inversion realizations converge to match the data well but obtain different solutions as shown in FIG. 7. As in FIG. 6, the central dots in the respective plots represent the true values. In this case, we still obtain accurate shear slowness, good borehole radius, but the median of other inverted parameters shifts away from the true values. In terms of uncertainties of the inverted parameters, we observe a similar trend with case 1.

From the inversion study, we confirm that this inverse problem is highly non-unique. The uncertainties of estimated parameters can be quantified.

When applying the trained neural network model for inversion of field data, different modal dispersion data are labeled and extracted from the Prony's method. A machine learning based method can also be developed for this application to make the process automatic and efficient.

In an embodiment, a machine learning framework is described to enhance the borehole sonic data interpretation. The machine learning technique can be used to train accurate and efficient neural network models to replace the computationally expensive solvers such as mode search and finite difference method. The trained models can be used as proxies of forward solvers for inversion.

The example used here is a seven-parameter ANNIE model in vertical wells, but the same concept and framework can be applied to other scenarios such as nine-parameter TIV model defined by bhr, dtm, rhom, dts, pr, rhob, and 3 Thomsen parameters epsilon, gamma and delta [See Thomsen], or cases that have more parameters, such as orthorhombic anisotropy, and in deviated, high-angle or horizontal wells where well deviation, well azimuth, and transmitter firing direction are extra input parameters, etc.

In addition to training a neural network as the forward proxy, it is also possible to train advanced neural networks for inferring model parameters with uncertainties from the field sonic data.

In some embodiments, a predefined parametric function e.g., Bessel function can be used to approximate the dispersion data i.e. dimension reduction, train neural networks to map from those function parameters to model parameters.

In some embodiments, variational auto encoder and other neural networks are combined to map from dispersion data to the model parameters.

In some embodiments, neural networks are trained to automatically label and extract different modal dispersion data from the Prony's method results.

Another aspect of this disclosure relates to labeling, extraction, and interpretation of borehole sonic dispersion data. In the oil and gas industry, borehole sonic measurements have been widely used for formation petrophysical evaluation and geomechanical characterization. Borehole sonic waves could be excited by different sources such as monopole, dipole, quadrupole. The guided waves present different modes such as Stoneley, flexural, and screw modes, which show dispersive characteristics. Dispersion analysis often yields borehole modes in the form of disconnected and scattered dots in frequency-slowness plane. Labeling, extraction, and interpretation of those different modes from these scattered dots are essential steps in the sonic interpretation. Traditional methods for dealing with this issue are either relying on signal processing [Aeron et al., "Automatic dispersion extraction using continuous wavelet transform", 2008 IEEE International Conference on Acoustics, Speech and Signal Processing, Las Vegas, N V, 2008, pp. 2405-2408] or based on a simplified model [See Wang and Endo et al., "Shear Parametric Inversion—SPI-3 and VKSPI", Sep. 28, 2005 at MSIP Seminar]. The signal processing-based methods ignore the physics; hence the solution is at times wild when the measurements are noisy or incomplete. Some methods are based on linear scaling of a simplified model, e.g., a homogeneous isotropic model. This method works well in many cases but often fails to honor the nonlinear effects caused by complicated sonic physics, such as formation anisotropy and near wellbore formation alteration, in a certain range. More complex and accurate physics-based models have not been used for dispersion labeling and extraction mainly due to the intractable computational resource requirement.

In an embodiment, a method for enhancing labeling, extraction, and interpretation of borehole sonic data using neural networks is described. Synthetic forward modeling results are pre-computed for different model scenarios and stored. These synthetic data are then utilized to train neural network models as an efficient approximation of the actual physical model which can be used for effective labeling, extraction and interpretation of field data. Combining different models, we can efficiently identify a different anisotropy mechanism. The algorithms and workflows do not rely on user input, are faster than conventional methods and enable real-time well-site interpretation.

Generation of Proxy Models for Approximating the Costly Forward Modeling

Firstly, analytical, semi-analytical, or numerical solutions are employed to generate synthetic dispersion data for selected parameter combinations in the physical range of the parameter space. As an example, for borehole sonic dipole dispersion caused by intrinsic TI anisotropy, an ANNIE model [Schoenberg et al., "Introducing ANNIE: A simple three-parameter anisotropic velocity model for shales", J. Seis. Expl., 5, 35-49, 1996] is used and we assume the parameters are varying in a certain range as below:

bhr: [bhr_lb, bhr_ub]
dtm: [dtm_lb, dtm_ub]
rhom: [rhom_lb, rhom_ub]
dts: [dts_lb, dts_ub]
pr: [pr_lb, pr_ub]
rhob: [rhob_lb, rhob_ub]
gamma: [gamma_lb, gamma_ub]
freq: [freq_lb, freq_ub]

Here, bhr, dtm, rhom, dts, pr, rhob, gamma, and freq represent borehole radius (inch), mud slowness (μs/ft), mud density (kg/m3), formation shear slowness (μs/ft), Poisson's ratio, formation density (kg/m3), Thomsen anisotropic parameter γ (unitless) [Thomsen, L., 1986, Weak elastic anisotropy, Geophysics, 51, 1954-1966], and frequency (kHz), respectively. The symbol "_lb" indicates a lower bound of the corresponding parameter, and "_ub" is for upper bound. The sampling density inside the physical range is dependent on the nonlinearity of the problem along each individual direction.

A mode search algorithm is run to select combinations of the above parameters in the defined ranges; in some embodiments, the mode search algorithm is run to every combination of the above parameters in the defined ranges. The inputs (for example, seven model parameters including bhr, dtm, rhom, dts, pr, rhob, and gamma) and corresponding outputs (different slowness values corresponding to different frequencies at sonic tool acquisition range) are stored in a data file.

A neural network can be trained using the inputs and outputs in the synthetic data. The machine learning problem can be phrased as follow: given a set of model parameters, find the corresponding slowness at a set of pre-defined frequencies. To solve this problem, although different neural network structures can be explored, here we consider a standard fully connected neural network, as conceptually depicted in FIG. 1, with ReLU activation functions. The number of hidden layers and neurons of the network can be optimized through the training process. An Adam optimizer is used to train the network. The objective function was a standard mean square error. The training process converges well without overfitting. The trained neural network model can be validated against the mode search. A benchmark shows that the trained neural network has achieved a four-order speedup compared to the mode search.

Labeling, Extraction, and Interpretation Using the Trained Neural Network

In the sonic data interpretation, one important method is to convert the waveforms received by the receiver array into the frequency domain, and process for the estimation of slowness and dispersion. Classical approaches, e.g., the Prony's method, are used for this processing. The obtained dispersion plot includes different modes and is usually noisy. An essential step is to label and extract different dispersion modes from the dispersion plot and then invert the extracted mode for relevant parameters.

Since we trained an efficient neural network model for the modeling of dipole dispersion mode, we developed a plurality of analysis methods that utilize the trained neural network model for automatic labeling, extraction, and inversion of the dipole dispersion data.

Analysis Method 1: Clustering with Neural Network Model Fitting

Figure 8:
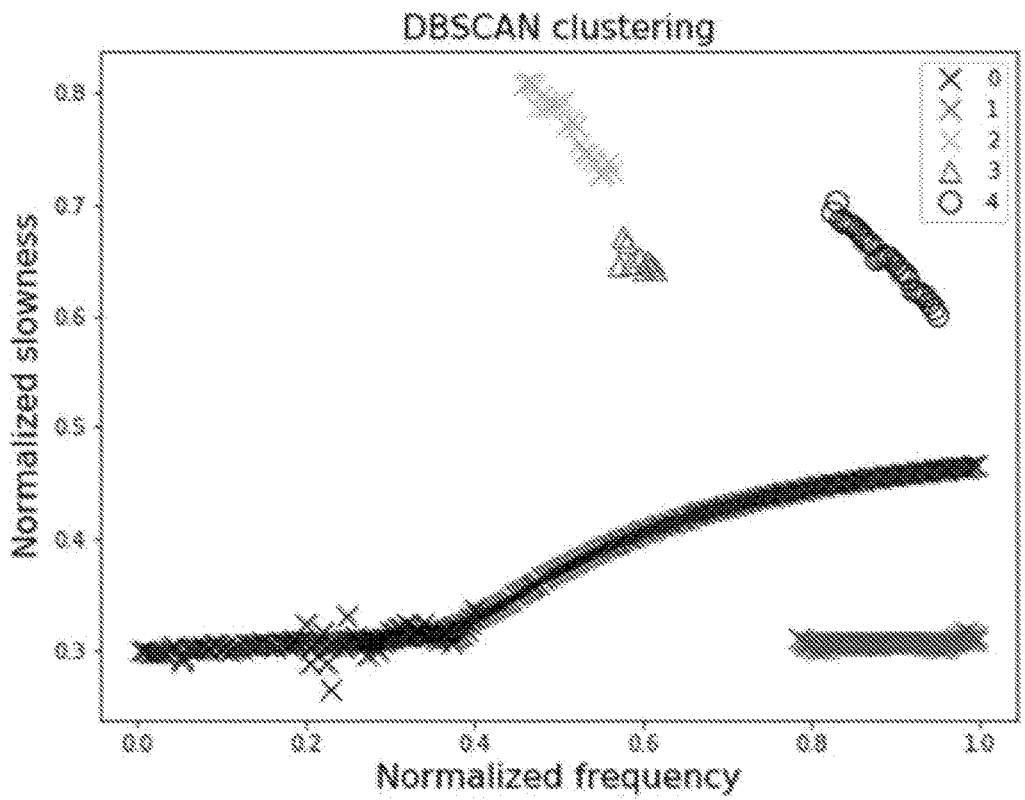
FIG. 8 depicts a graph for analysis method one.

In this analysis method, we perform a clustering operation to the normalized dispersion plot, i.e., both slowness and frequency are normalized to a range of 0 to 1 by defining a minimum and maximum slowness and a minimum and maximum frequency. The discrete slowness-frequency points are clustered into a limited number of classes, see FIG. 8. In this work, we used the DBSCAN method [Ester et al., "A density-based algorithm for discovering clusters in large spatial databases with noise. Proceedings of the Second International Conference on Knowledge Discovery and Data Mining (KDD-96)", AAAI Press. pp. 226-231, 1996] but other methods are contemplated.

Figure 9:
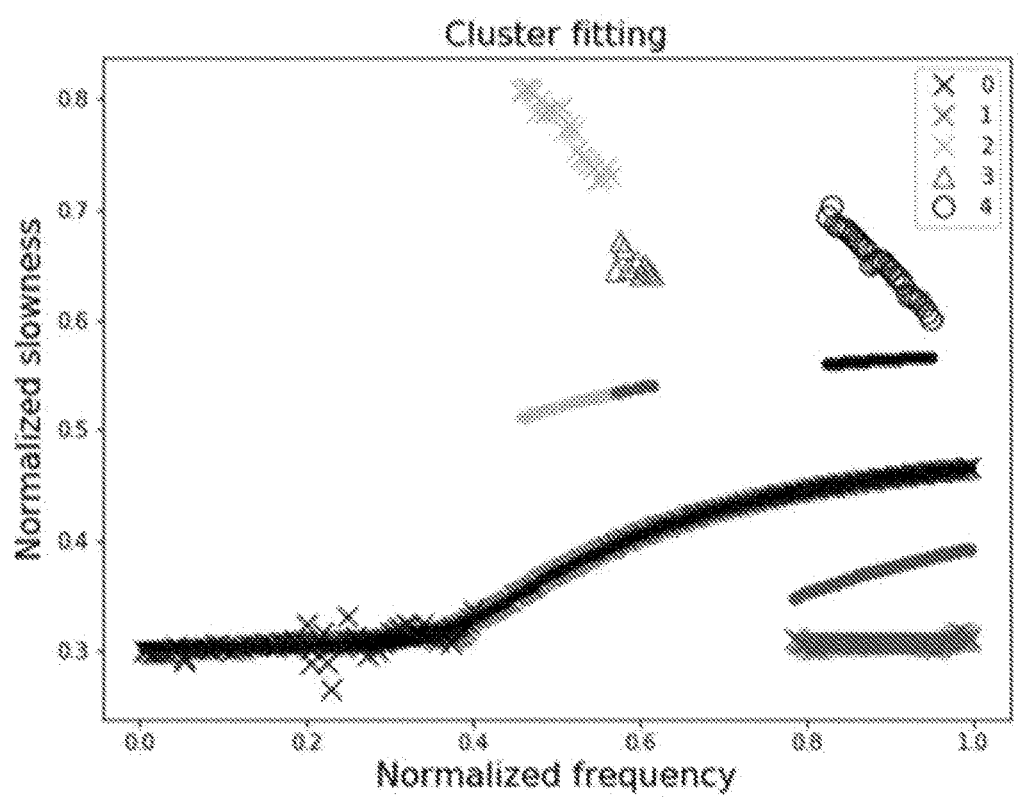
FIG. 9 depicts a graph for analysis method one below.

In some embodiments, for each class, an inversion is performed using the neural network model to match the data points belonging to that class (See FIG. 9 where each class is inverted using a neural network model. Solid dots are reconstructed dispersion modes obtained from the inversion. Class 0 is well matched as shown by the good fitting between raw data ('x' and circles) and modeled data (solid dots). Other classes are not fitted because they are out of a pre-defined dipole dispersion physical region). The classes, which are far from the pre-defined dipole dispersion physics region, will show large misfit [e.g., the trend of the class 2 in FIG. 9 is obviously different from any dipole dispersion mode, hence the misfit is very large (e.g., larger than 1E5) if we use the dipole dispersion model to fit the data points belonging to this class], while the classes lying in the region will be well matched showing a small residual error (e.g., the class 0 in FIG. 9, with residual error/misfit less than 0.01).

In some embodiments, an inversion is performed merely for one or more classes using the neural network model to match the data points belonging to respective classes in the one or more classes.

Figure 10:
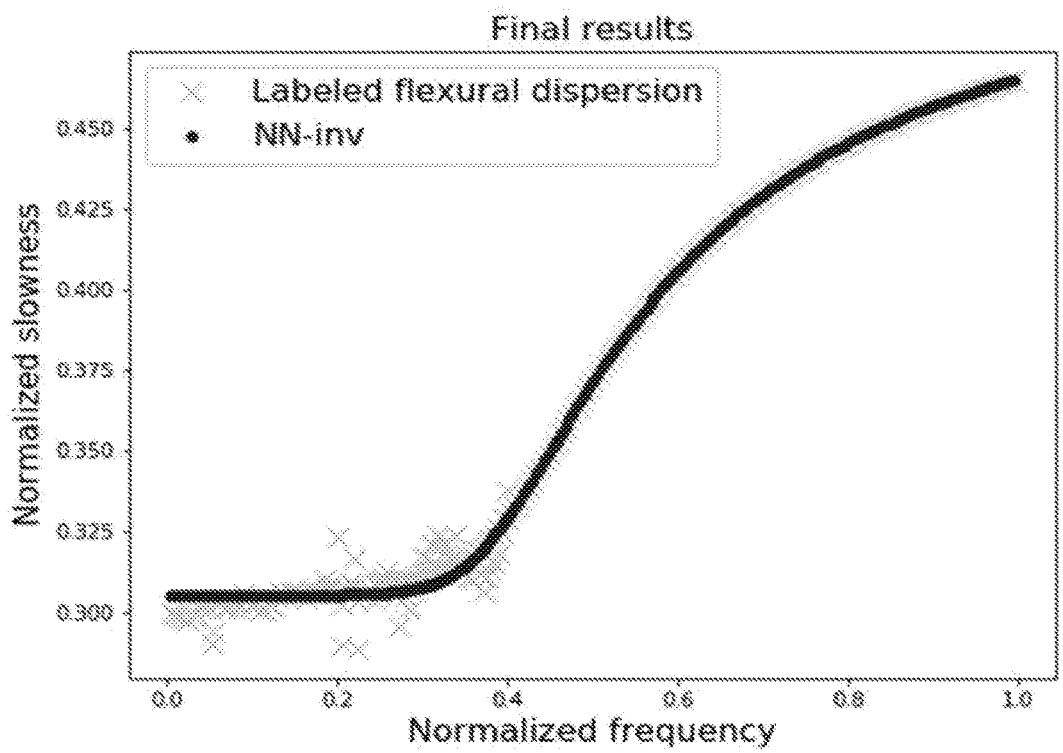
FIG. 10 depicts a graph for analysis method one below.

The classes with large misfit error are removed from the data. The classes associated with small misfit error are merged and inverted again as a whole. In most cases this will lead to a good reconstructed dipole dispersion curve and the data points can be filtered based on the distance from this curve (See FIG. 10, where all classes with small misfit are re-merged and then inverted with additional iterations. All points near to the reconstructed dipole dispersion curve are labeled and extracted. It has also been inverted and interpreted simultaneously during the process).

Analysis Method 2: Model-Based Progressive Fitting and Filtering

In this analysis method, we perform inversion on raw data in the dispersion plot to reconstruct a best fit dipole dispersion curve. Obviously, this reconstructed curve will be offset by the outliers and data belonging to other modes. However, it should be reasonably not too far from the actual dipole dispersion curve. Hence, we can use a distance-based filter [e.g., filter|iteration0=100, filter|iteration1=70, filter|iteration2=50, filter|iteration3=30, filter|iteration4=10, filter|iteration5=10, . . . ] to remove the outliers and some data points too far from the dipole dispersion mode. After filtering, we repeat the inversion to the remaining data and expect to obtain a better reconstructed dipole dispersion curve, and then we can again apply the distance-based filter to further clean up the data. We repeat this process and choose an adaptive filter which decreases the distance with increasing iterations. The iteration will be stopped if we reach the predefined maximum iterations (e.g., 3, 4, 5, 6, 7, 8, 9, 10, or more where appropriate) or the misfit residual error is lower than a predefined threshold (e.g., 5E-5). Different adaptive filters can be designed, e.g., it can be pre-defined or automatically computed based on data variation (e.g., filter=F(std(Y)), where Y is the dispersion points and F is a designed function). These progressive fitting and filtering process are demonstrated in FIGS. 11, 12, 13, 14, and 15.

Figure 11:
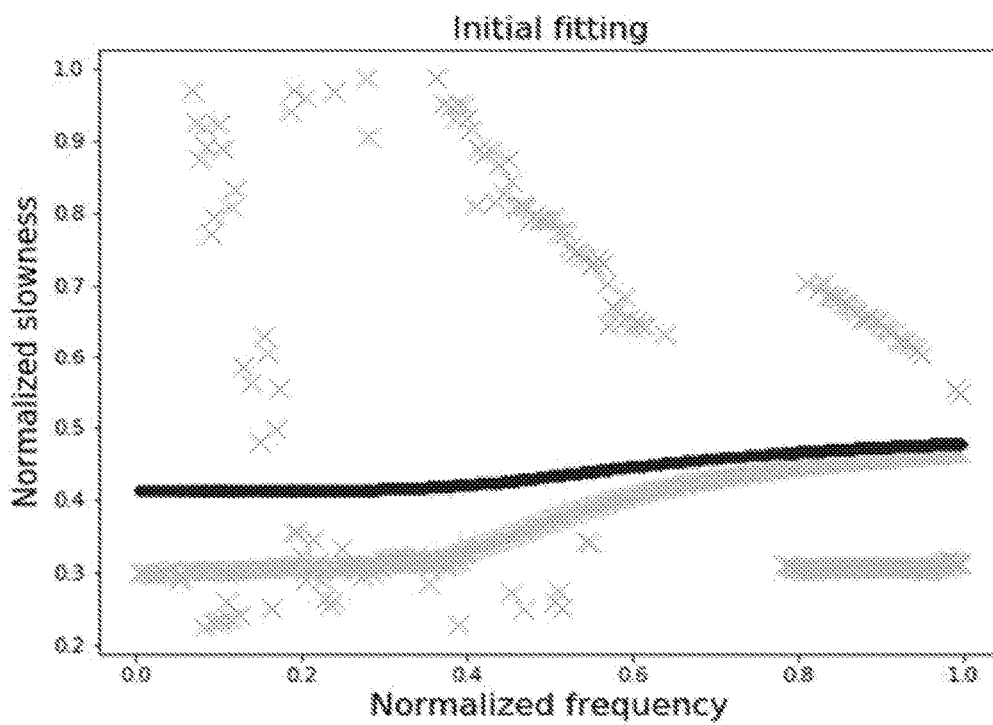
FIG. 11 depicts a graph for analysis method two below which utilizes a neural network mode and performs inversion on raw data.

In FIG. 11, which utilizes a neural network mode and performs inversion on raw data, a dipole dispersion curve (black dots) will be reconstructed. Filtering is performed with a relatively large distance, e.g., 100 us/ft.

Figure 12:
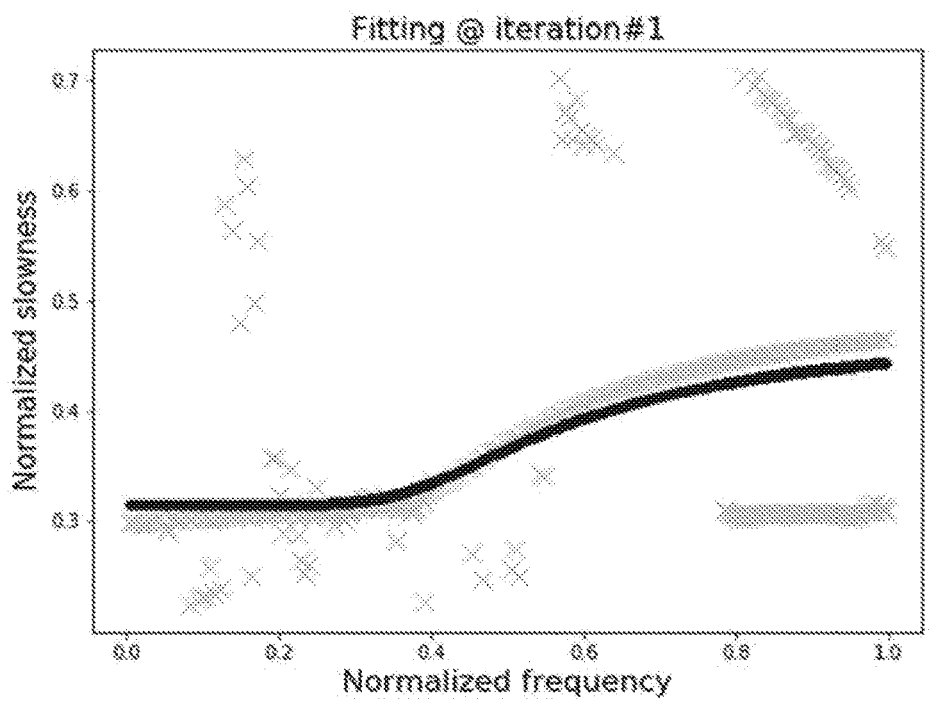
FIG. 12 depicts a graph for analysis method two below.

In FIG. 12, an inversion is re-run to the remaining data (after filtering from the previous step) to obtain a new reconstructed curve. Filtering is performed with reduced distance, e.g., 70 us/ft.

Figure 13:
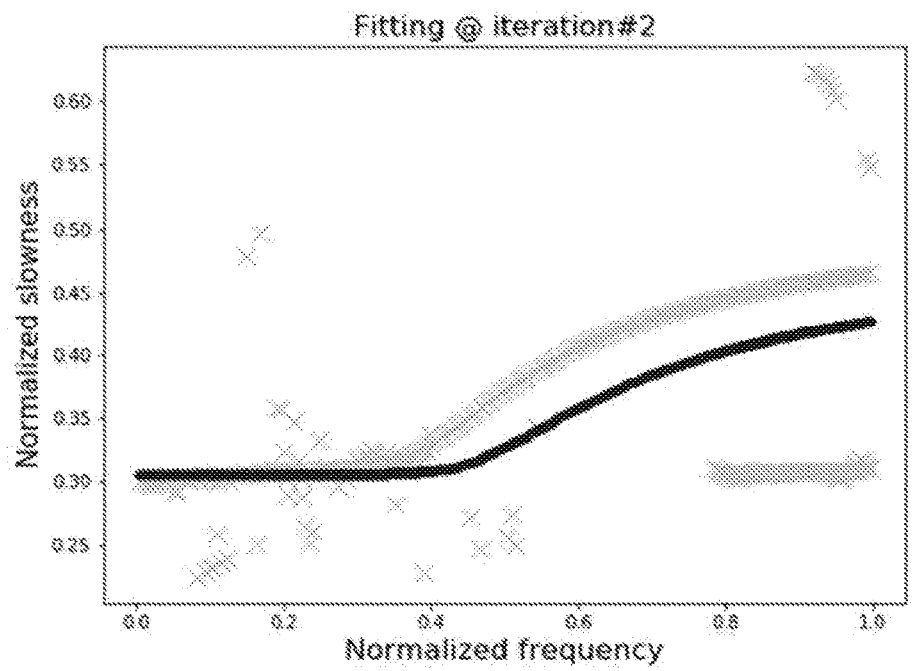
FIG. 13 depicts a graph for analysis method two below.

In FIG. 13, an inversion is re-run to the remaining data (after filtering from previous step) to obtain a new reconstructed curve. Filtering is performed with reduced distance.

Figure 14:
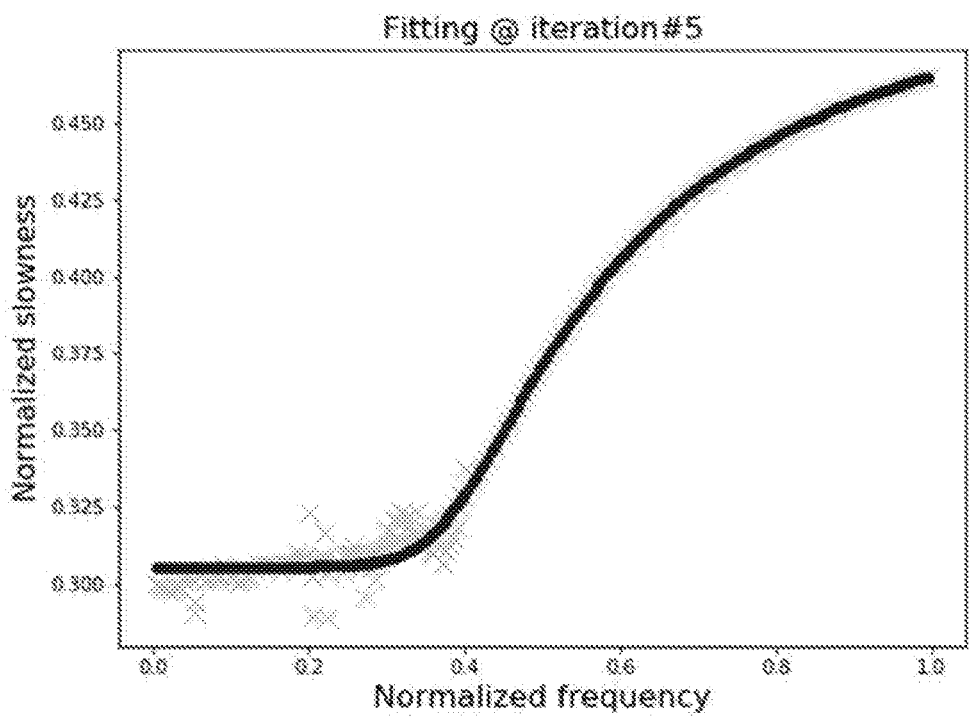
FIG. 14 depicts a graph for analysis method two below.

In FIG. 14, inversion is continuously re-run to the remaining data (after filtering from previous step) to obtain a new reconstructed curve. Filtering is performed with reduced distance.

Figure 15:
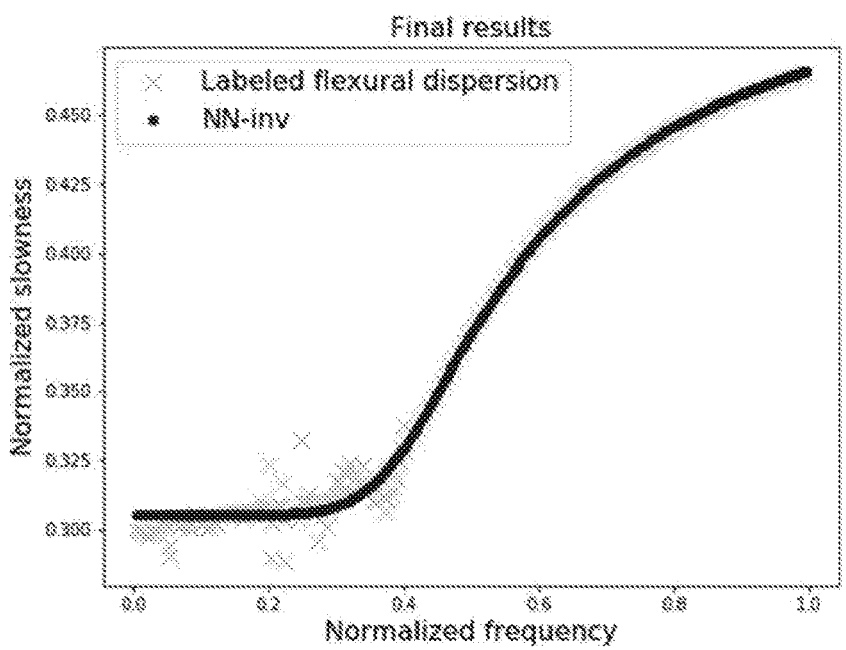
FIG. 15 depicts a graph for analysis method two below.

In FIG. 15, the last step is to take back all the raw data and filter the raw data based on the reconstructed dipole dispersion curve. The inversion can be re-run to the remaining data or inversion results from the last step can be used.

Analysis Method 3: Combining Method 1 and Method 2

Figure 16:
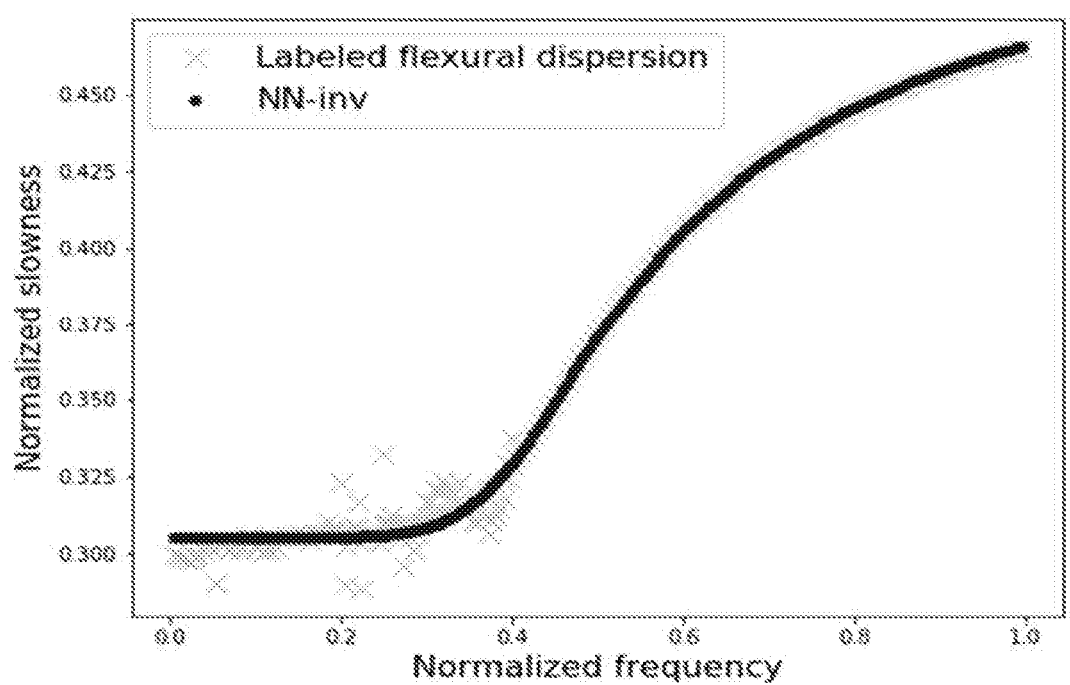
FIG. 16 depicts a graph for analysis method three below which shows the combination of method one and two below.

This analysis method is a combination of analysis methods 1 and 2, i.e., a clustering is performed first and some classes with large misfit residual error (e.g., larger than 0.01, though in varying circumstances, other error thresholds may be used, e.g., larger than 0.05, larger than 0.005, etc.) are removed from the data. For the remaining data, we apply method 2 for a progressive fitting and filtering. In the last step, we take all data points back and filter them based on a predefined distance from the final reconstructed dipole dispersion curve. The result is shown in FIG. 16.

To enhance the robustness of the algorithm, in the clustering step, we may split the data into different frequency bands and perform clustering for each band separately. After removing the classes with large residual error, we re-merge all remaining classes and proceed with the progressive fitting and filtering.

In the above three analysis methods, the labeling, extraction, and inversion are achieved in one procedure, i.e., we successfully label the dipole dispersion data from the raw data and run the inversion on the identified data to obtain the model parameters.

Automatically Identify the Anisotropy Mechanism

In the above embodiments, a workflow for labeling, extraction, and inversion of dipole dispersion data using neural network that honors the intrinsic TI anisotropy effect is described. The same procedure can be applied to other dispersion modes from the same source, or from different sources. The same procedure can also be applied using other neural network models that honor other mechanisms such as different anisotropy types (e.g., stress-induced anisotropy, fracture-induced anisotropy). Once we establish neural network models of different physical mechanism for each dispersion mode, it is efficient to apply the models to a certain dataset. Based on the data fitting we can identify which physical mechanism is dominating the sonic data.

In an embodiment, a workflow is developed with different methods to enable a fully automated labeling, extraction, and inversion of borehole sonic dipole dispersion data, which can be extended for other modes. Once we developed models for all different dispersion modes, we can easily and efficiently apply the workflow with all models for the measured data. Based on the data fitting residual error, we can estimate and identify different physical phenomena presented by the data including different anisotropy mechanisms.

In an embodiment, a general workflow to utilize the trained neural network proxy models to enhance borehole sonic dispersion data interpretation is described.

In an embodiment, a plurality of methods may be utilized for automated labeling, extraction, and inversion of dispersion modes.

In some embodiments, the clustering methods include an option to split the data to different frequency bands and cluster separately.

The same workflow can be extended for other borehole sonic and ultrasonic dispersion modes, e.g., quadrupole, Stoneley, pseudo-Rayleigh, etc., in either LWD or wireline logging, in either open hole or cased hole logging. Those with skill in the art will appreciate that the non-limiting methods 1700, 1800, 1900, 2000, 2100, and 2200 disclosed herein and illustrated in FIGS. 17-22 may be applied in any of these dispersion modes.

In an embodiment, for specific field data, we can perform this workflow using all different models, then we can automatically label, extract, and invert all dispersion modes. Those with skill in the art will appreciate that the non-limiting methods 1700, 1800, 1900, 2000, 2100, and 2200 disclosed herein and illustrated in FIGS. 17-22 may be applied in any of these types of field data.

In some embodiments, the disclosed analysis methods and other techniques herein, may be used to characterize any anisotropy mechanism. Based on the data fitting, we can estimate and identify what is the potential mechanism contributing to the anisotropy presented in the any borehole data. Those with skill in the art will appreciate that the non-limiting methods 1700, 1800, 1900, 2000, 2100, and 2200 disclosed herein and illustrated in FIGS. 17-22 may be utilized to characterize any anisotropy mechanism.

Figure 17:
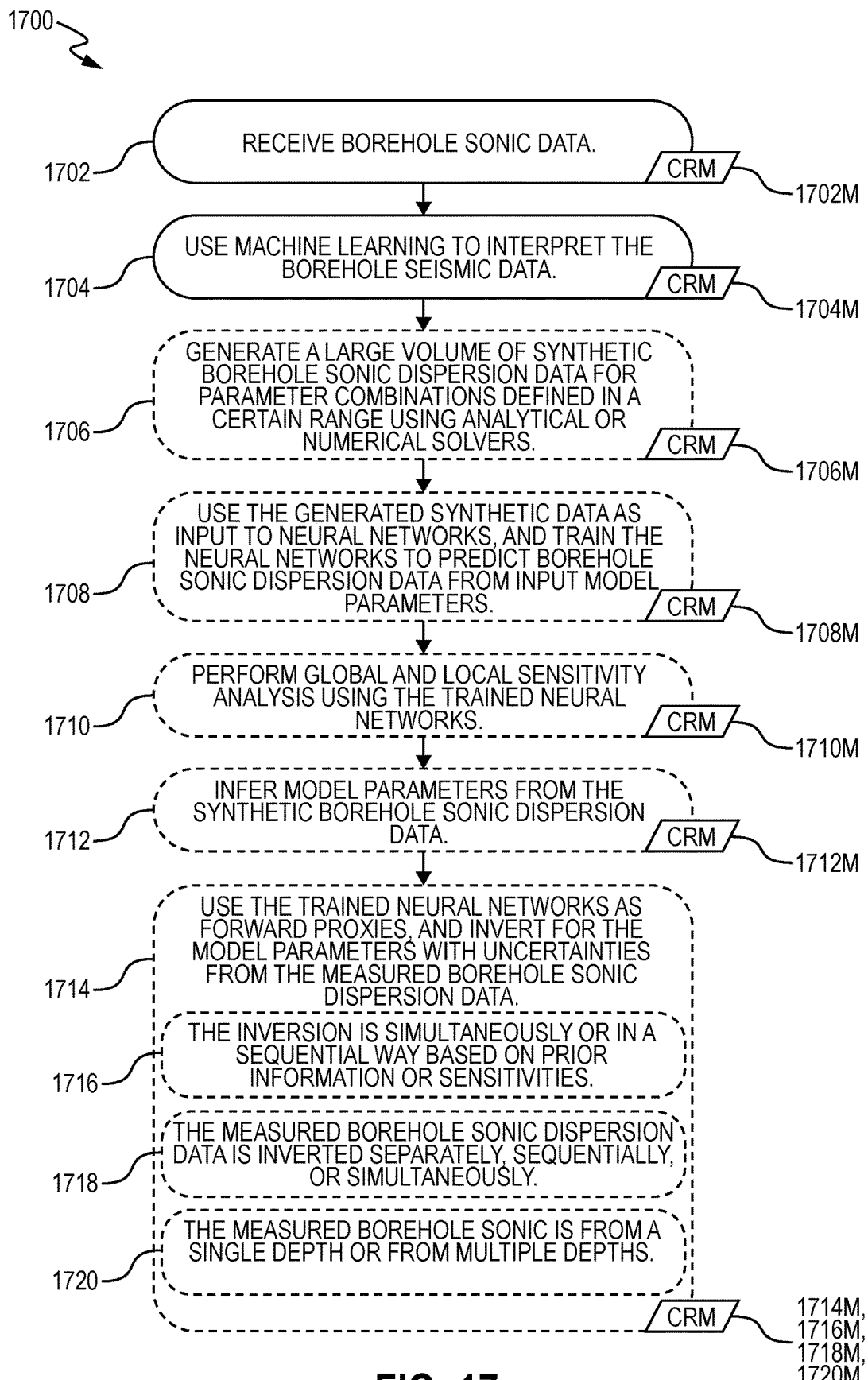
FIGS. 17-22 illustrate various methods according to some embodiments.

Attention is now directed to FIG. 17 that discloses a computer-implemented method 1700 for interpreting borehole sonic data. In some embodiments of method 1700, the borehole sonic dispersion data is in the ultrasound range.

Method 1700 includes receiving 1702, using one or more processors, borehole sonic data. Machine learning is used 1704 to interpret the borehole sonic data.

In some embodiments, method 1700 includes generating 1706 a large volume of synthetic borehole sonic dispersion data for parameter combinations defined in a certain range using analytical or numerical solvers. For example, in some embodiments, millions of dispersion curves may be computed to generate the volume of synthetic borehole sonic dispersion data.

In some embodiments, method 1700 includes using 1708 the generated synthetic data as input to neural networks, and training the neural networks to predict borehole sonic dispersion data from input model parameters.

In some embodiments, method 1700 includes performing 1710 global and local sensitivity analysis using the trained neural networks.

In some embodiments, method 1700 includes inferring 1712 model parameters from the synthetic borehole sonic dispersion data.

In some embodiments, method 1700 includes using 1714 the trained neural networks as forward proxies, and inverting for the model parameters with uncertainties from the measured borehole sonic dispersion data. In further embodiments, the inverting is simultaneously or in a sequential way based on prior information or sensitivities (see FIG. 17, 1716). In further embodiments, the measured borehole sonic dispersion data is inverted separately, sequentially, or simultaneously (see FIG. 17, 1718). In further embodiments, the measured borehole sonic is from a single depth or from multiple depths (see FIG. 17, 1720).

Figure 18:
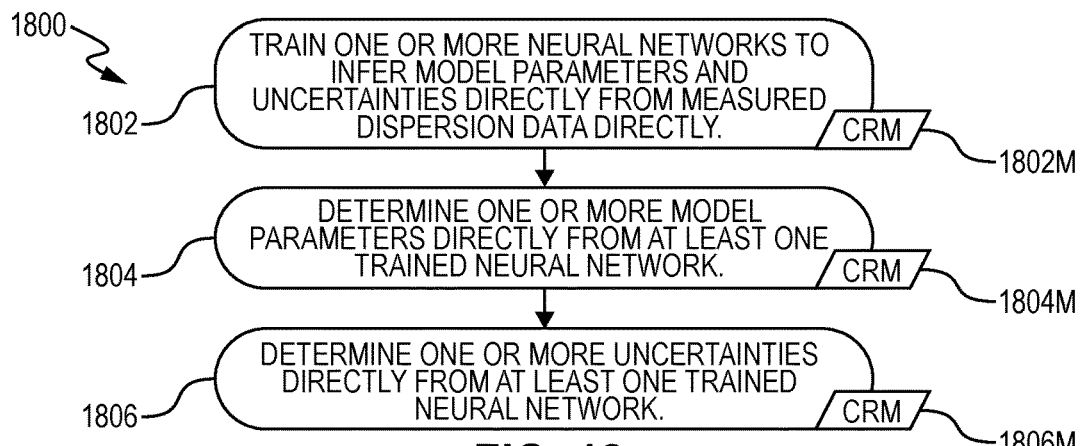

Attention is now directed to FIG. 18 that discloses a computer-implemented method 1800 for interpreting borehole sonic data.

Method 1800 includes training 1802 one or more neural networks to infer model parameters and uncertainties directly from measured dispersion data directly. Method 1800 also includes determining 1804 one or more model parameters directly from at least one trained neural network. Finally, method 1800 also includes determining 1806 one or more uncertainties directly from at least one trained neural network.

Figure 19:
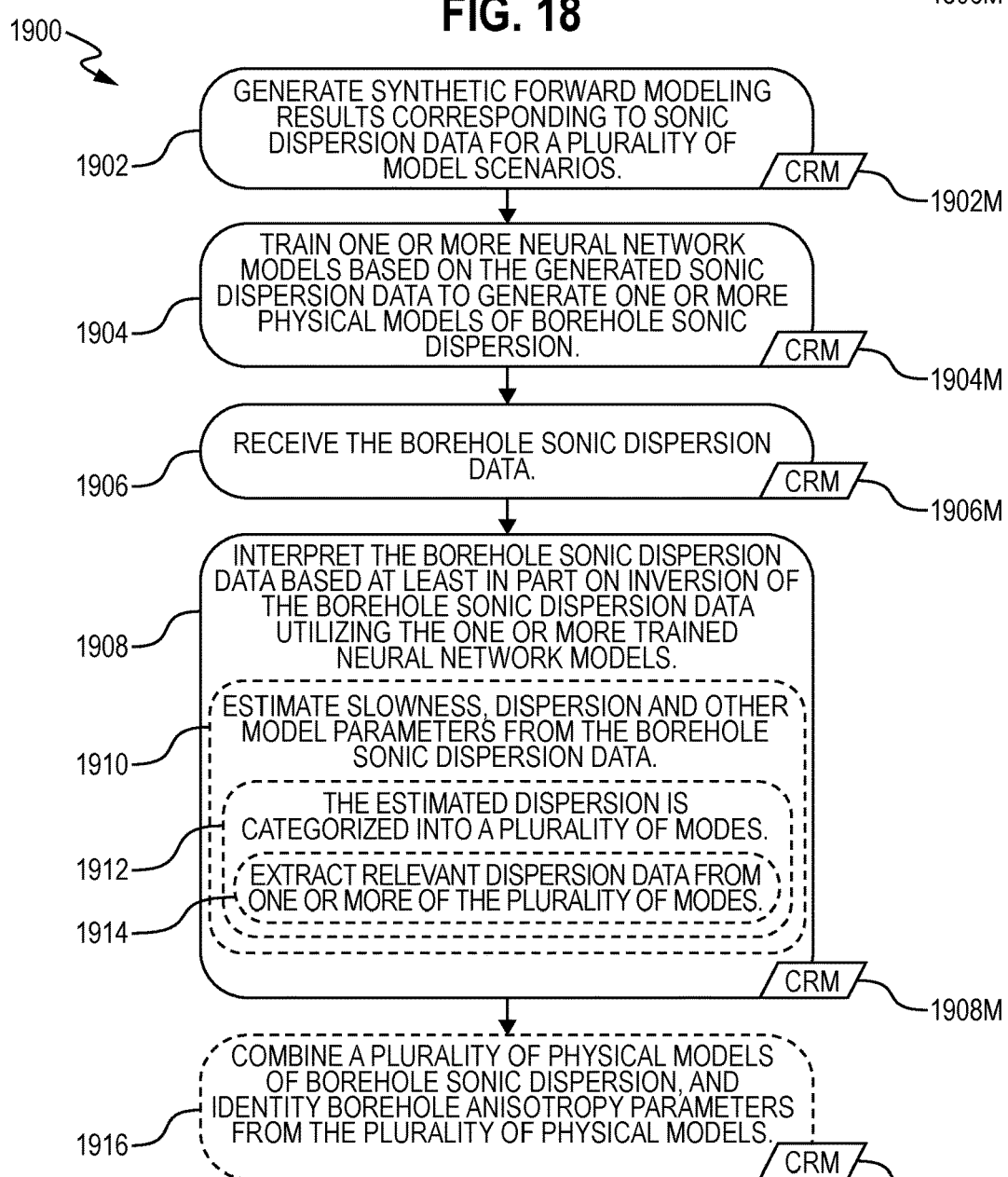

Attention is now directed to FIG. 19 that discloses a method 1900 for processing borehole sonic dispersion data.

Method 1900 includes generating 1902 synthetic forward modeling results corresponding to sonic dispersion data for a plurality of model scenarios.

Method 1900 also includes training 1904 one or more neural network models based on the generated sonic dispersion data to generate one or more physical models of borehole sonic dispersion.

Method 1900 also includes receiving 1906 the borehole sonic dispersion data. In some embodiments of method 1900, the borehole sonic dispersion data is in the ultrasound range.

Method 1900 also includes interpreting 1908 the borehole sonic dispersion data based at least in part on inversion of the borehole sonic dispersion data utilizing the one or more trained neural network models.

In some embodiments, interpreting the borehole sonic dispersion data includes estimating slowness, dispersion, and/or other model parameters from the borehole sonic dispersion data (see FIG. 19, 1910).

In further embodiments, the estimated dispersion is categorized into a plurality of modes (see FIG. 19, 1912). In further embodiments, relevant dispersion data is extracted from one or more of the plurality of modes (see FIG. 19, 1914).

In some embodiments, interpreting the borehole sonic dispersion data further comprises combining a plurality of physical models of borehole sonic dispersion; and identifying borehole anisotropy parameters from the plurality of physical models (see FIG. 19, 1916).

Figure 20:
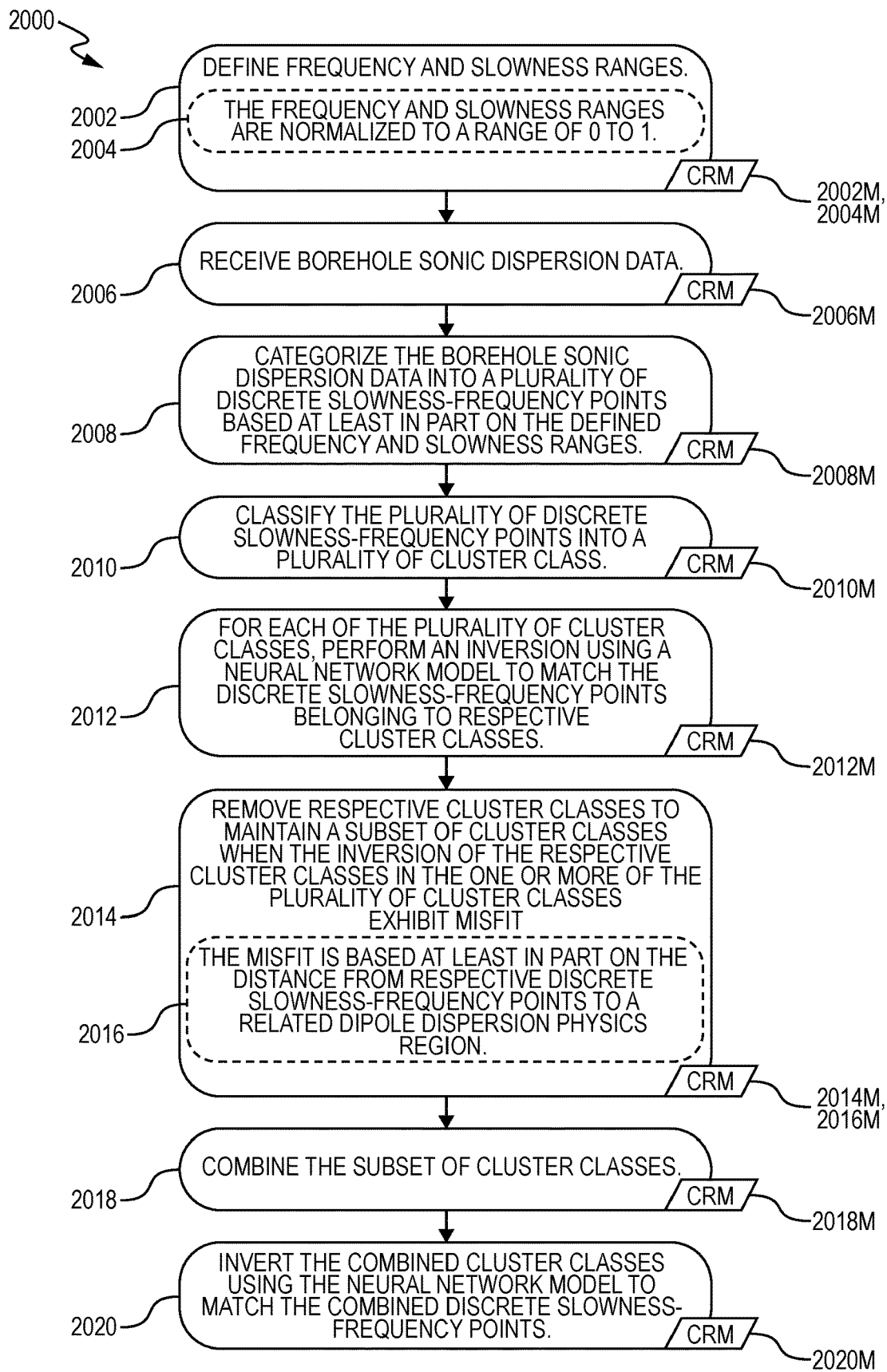

Attention is now directed to FIG. 20 that discloses a method 2000 for processing borehole sonic dispersion data.

Method 2000 includes defining 2002 frequency and slowness ranges. In some embodiments, the frequency and slowness ranges are normalized to a range of 0 to 1 (see FIG. 20, 2004).

Method 2000 also includes receiving 2006 the borehole sonic dispersion data. In some embodiments of method 2000, the borehole sonic dispersion data is in the ultrasound range.

Method 2000 also includes categorizing 2008 the borehole sonic dispersion data into a plurality of discrete slowness-frequency points based at least in part on the defined frequency and slowness ranges.

Method 2000 also includes classifying 2010 the plurality of discrete slowness-frequency points into a plurality of cluster classes.

Method 2000 also includes that, for each of the plurality of cluster classes, an inversion is performed 2012 using a neural network model to match the discrete slowness-frequency points belonging to respective cluster classes.

When the inversion of respective cluster classes in the one or more of the plurality of cluster classes exhibit misfit, method 2000 also includes removing 2014 the respective cluster classes to maintain a subset of cluster classes.

In some embodiments, the misfit is based at least in part on the distance from respective discrete slowness-frequency points to a related dipole dispersion physics region (see FIG. 20, 2016).

Method 2000 also includes combining 2018 the subset of cluster classes.

Method 2000 also includes inverting 2020 the combined cluster classes using the neural network model to match the combined discrete slowness-frequency points.

Figure 21:
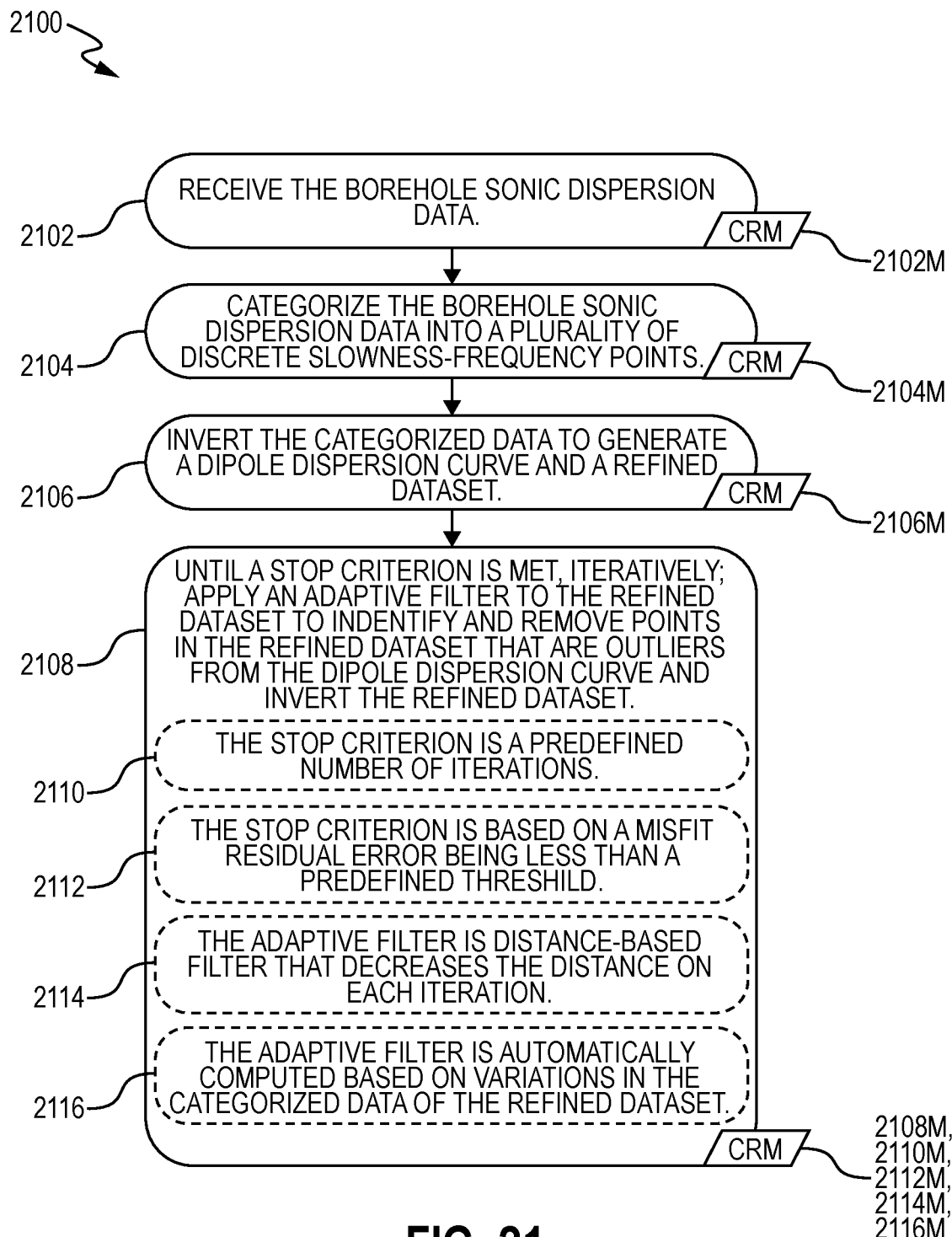
Figure 22:
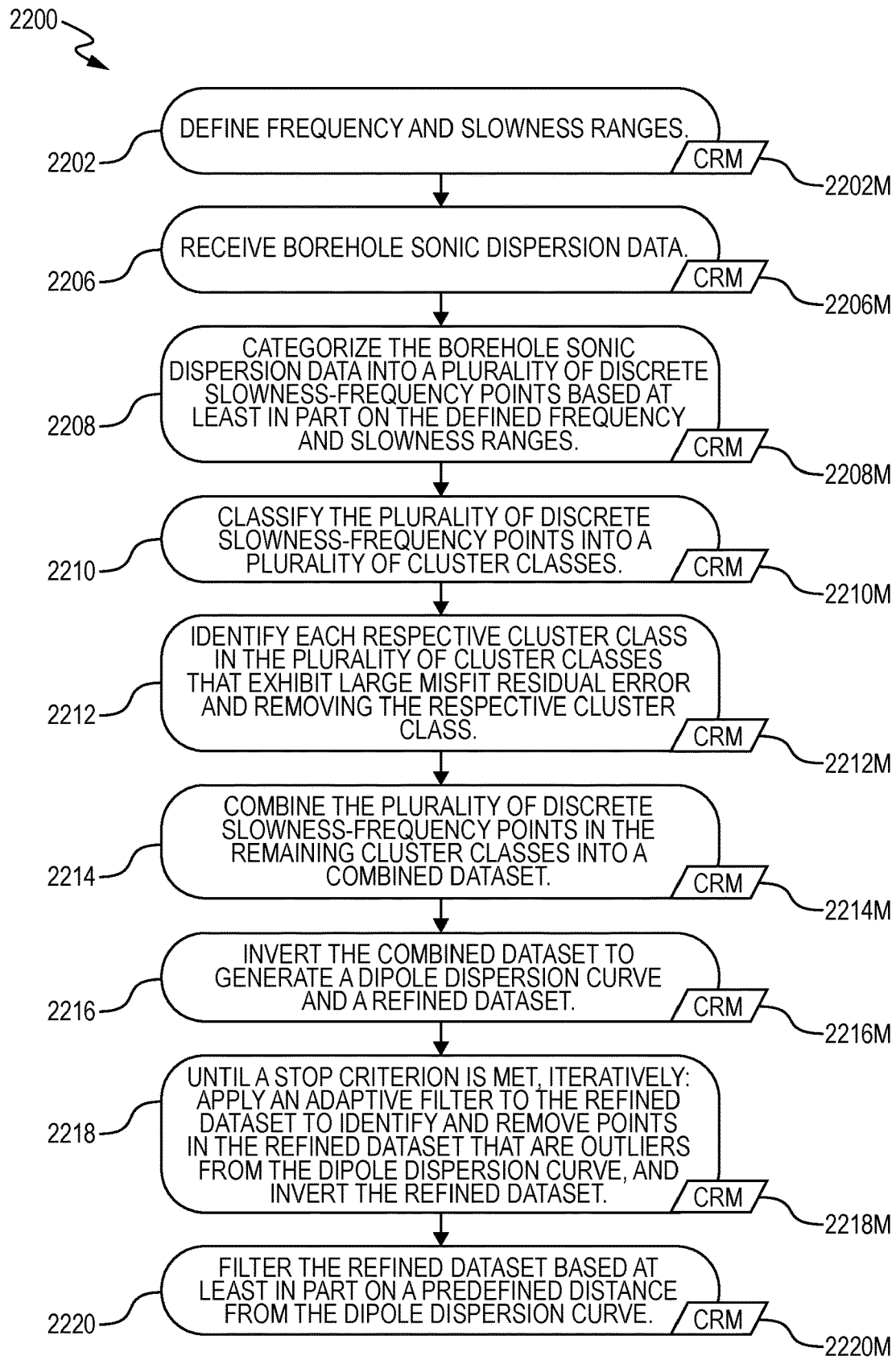

Attention is now directed to FIG. 21 that discloses a method 2100 for processing borehole sonic dispersion data.

Method 2100 includes receiving 2102 the borehole sonic dispersion data. In some embodiments of method 2100, the borehole sonic dispersion data is in the ultrasound range.

Method 2100 also includes categorizing 2104 the borehole sonic dispersion data into a plurality of discrete slowness-frequency points.

Method 2100 also includes inverting 2106 the categorized data to generate a dipole dispersion curve and a refined dataset;

Method 2100 also includes performing 2108 iterative actions until a stop criterion is met; specifically, applying an adaptive filter to the refined dataset to identify and remove points in the refined dataset that are outliers from the dipole dispersion curve, and inverting the refined dataset.

In some embodiments, the stop criterion is a predefined number of iterations (see FIG. 21, 2110).

In some embodiments, the stop criterion is based on a misfit residual error being less than a predefined threshold (see FIG. 21, 2112).

In some embodiments, the adaptive filter is a distance-based filter that decreases the distance on each iteration (see FIG. 21, 2114).

In some embodiments, the adaptive filter is automatically computed based on variations in the categorized data or the refined dataset (see FIG. 21, 2116).

Attention is now directed to FIG. 21 that discloses a method 2100 for processing borehole sonic dispersion data.

Method 2200 includes defining 2202 frequency and slowness ranges.

Method 2200 also includes receiving 2206 the borehole sonic dispersion data. In some embodiments of method 2200, the borehole sonic dispersion data is in the ultrasound range.

Method 2200 also includes categorizing 2208 the borehole sonic dispersion data into a plurality of discrete slowness-frequency points based at least in part on the defined frequency and slowness ranges.

Method 2200 also includes classifying 2210 the plurality of discrete slowness-frequency points into a plurality of cluster classes.

Method 2200 also includes identifying 2212 each respective cluster class in the plurality of cluster classes that exhibit large misfit residual error and removing the respective cluster class.

Method 2200 also includes combining 2214 the plurality of discrete slowness-frequency points in the remaining cluster classes into a combined dataset.

Method 2200 also includes inverting 2216 the combined dataset to generate a dipole dispersion curve and a refined dataset.

Method 2200 also includes performing 2218 iterative actions until a stop criterion is met; specifically, applying an adaptive filter to the refined dataset to identify and remove points in the refined dataset that are outliers from the dipole dispersion curve, and inverting the refined dataset.

Method 2200 also includes filtering 2220 the refined dataset based at least in part on a predefined distance from the dipole dispersion curve.

Figure 23:
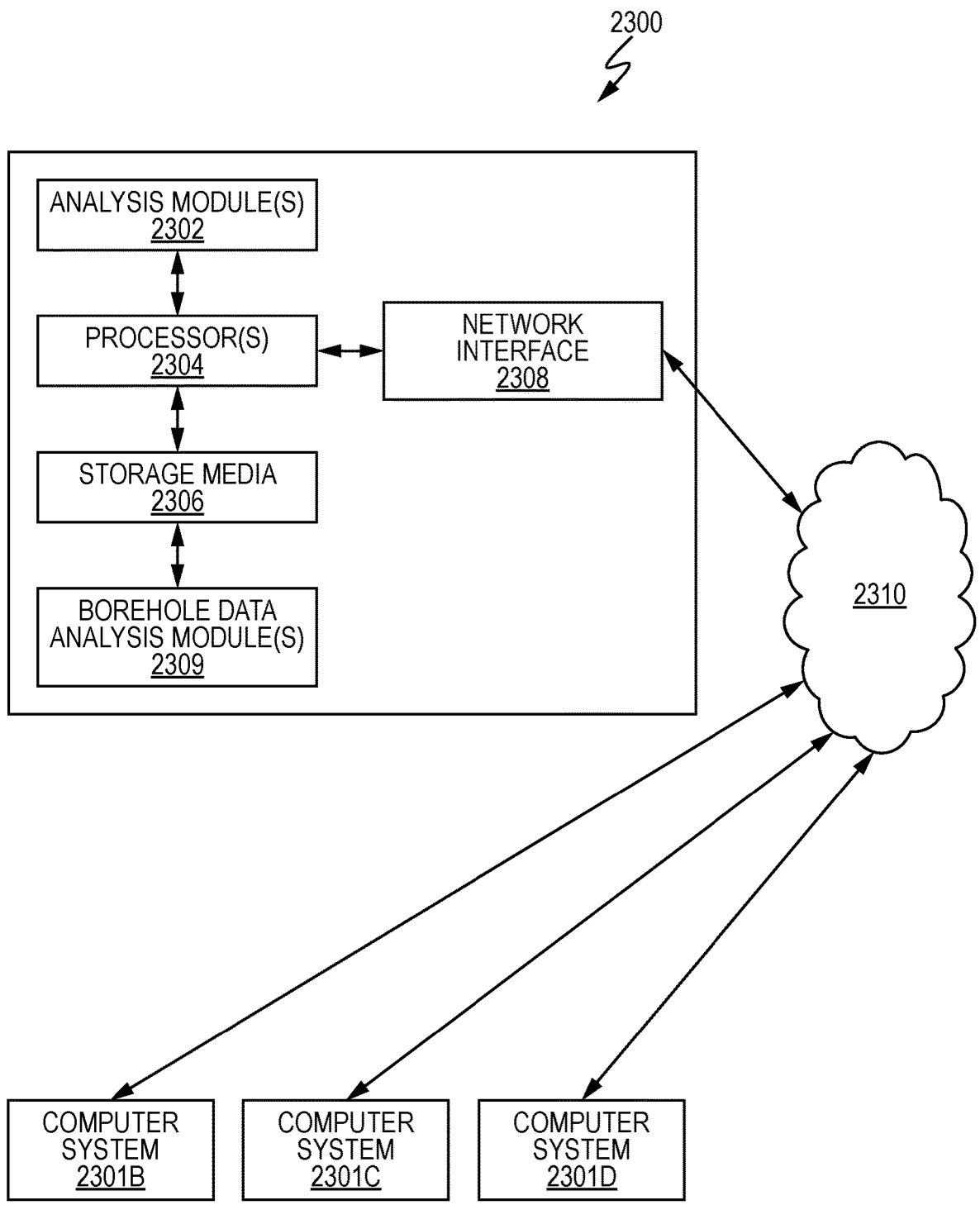
FIG. 23 illustrates an example computing system in accordance with some embodiments.

Attention is now directed to FIG. 23. In some embodiments, the methods of the present disclosure may be executed by a computing system. FIG. 23 illustrates an example of such a computing system 2300, in accordance with some embodiments. The computing system 2300 may include a computer or computer system 2301A, which may be an individual computer system 2301A or an arrangement of distributed computer systems. The computer system 2301A includes one or more analysis modules 2302 that are configured to perform various tasks according to some embodiments, such as one or more methods disclosed herein. In some embodiments, analysis modules 2302 include machine learning, artificial intelligence, and/or neural net logic for supervised, unsupervised, and other forms of machine learning as those with skill in the art will appreciate.

To perform these various tasks, the analysis module 2302 executes independently, or in coordination with, one or more processors 2304, which is (or are) connected to one or more storage media 2306. The processor(s) 2304 is (or are) also connected to a network interface 2308 to allow the computer system 2301A to communicate over a data network 2310 with one or more additional computer systems and/or computing systems, such as 2301B, 2301C, and/or 2301D (note that computer systems 2301B, 2301C and/or 2301D may or may not share the same architecture as computer system 2301A, and may be located in different physical locations, e.g., computer systems 2301A and 2301B may be located in a processing facility, while in communication with one or more computer systems such as 2301C and/or 2301D that are located in one or more data centers, and/or located in varying countries on different continents). Those with skill in the art will appreciate that network 2310 may include cloud processing and/or storage infrastructure so that some or all of computing system 2300 may be cloud processing enabled to support Software as a Service offerings.

A processor may include a microprocessor, microcontroller, processor module or subsystem, programmable integrated circuit, programmable gate array, or another control or computing device.

The storage media 2306 may be implemented as one or more computer-readable or machine-readable storage media. Note that while in the example embodiment of FIG. 23 storage media 2306 is depicted as within computer system 2301A, in some embodiments, storage media 2306 may be distributed within and/or across multiple internal and/or external enclosures of computing system 2301A and/or additional computing systems. Storage media 2306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions or located at a remote site from which machine-readable instructions may be downloaded over a network for execution.

In some embodiments, computing system 2300 contains one or more borehole data analysis module(s) 2309. In the example of computing system 2300, computer system 2301A includes the borehole data analysis module 2309. In some embodiments, a single borehole data analysis module may be used to perform some aspects of one or more embodiments of the methods disclosed herein. In other embodiments, a plurality of borehole data analysis modules may be used to perform some aspects of methods herein.

It should be appreciated that computing system 2300 is merely one example of a computing system, and that computing system 2300 may have more or fewer components than shown, may combine additional components not depicted in the example embodiment of FIG. 23, and/or computing system 2300 may have a different configuration or arrangement of the components depicted in FIG. 23. The various components shown in FIG. 23 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 2300, FIG. 23), and/or through manual control by a user who may make determinations regarding whether a given step, action, template, model, or set of curves has become sufficiently accurate for the evaluation of the subsurface three-dimensional geologic formation under consideration.

Moreover, methods 1700, 1800, 1900, 2000, 2100, and 2200 are shown as including various computer-readable storage medium (CRM) blocks 1702m, 1704m, 1706m, 1708m, 1710m, 1712m, 1714m, 1716m, 1718m, 1720m, 1802m, 1804m, 1806m, 1902m, 1904m, 1906m, 1908m, 1910m, 1912m, 1914m, 1916m, 2002m, 2004m, 2006m, 2008m, 2010m, 2012m, 2014m, 2016m, 2018m, 2020m, 2102m, 2104m, 2106m, 2108m, 2110m, 2112m, 2114m, 2116m, 2118m, 2120m, 2202m, 2204m, 2206m, 2208m, 2210m, 2212m, 2214m, 2216m, 2218m, and 2220m that can include processor-executable instructions that can instruct a computing system, such as the example computing system 2300 provided in FIG. 23, to perform one or more of the actions described with respect to their respective methods.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for processing borehole sonic dispersion data, comprising:
    defining a frequency range;
    defining a slowness range;
    receiving the borehole sonic dispersion data;
    categorizing the borehole sonic dispersion data into a plurality of discrete slowness-frequency points based at least in part on the defined frequency and slowness ranges;
    classifying the plurality of discrete slowness-frequency points into a plurality of cluster classes;
    identifying each respective cluster class in the plurality of cluster classes that exhibit large misfit residual error and removing the respective cluster class;
    combining the plurality of discrete slowness-frequency points in the remaining cluster classes into a combined dataset;
    inverting the combined dataset to generate a dipole dispersion curve and a refined dataset;
    until a stop criterion is met, iteratively:
        applying an adaptive filter to the refined dataset to identify and remove points in the refined dataset that are outliers from the dipole dispersion curve; and
        inverting the refined dataset; and
    filtering the refined dataset based at least in part on a predefined distance from the dipole dispersion curve.

2. The method of claim 1, wherein the stop criterion is a predefined number of iterations.

3. The method of claim 1, wherein the stop criterion is based on a misfit residual error being less than a predefined threshold.

4. The method of claim 1, wherein the adaptive filter is a distance-based filter that decreases the distance on each iteration.

5. The method of claim 1, wherein the adaptive filter is automatically computed based on variations in the categorized data or the refined dataset.

* * * * *